United States Patent
Dupont (10) Patent No.: US 11,038,693 B2
(45) Date of Patent: Jun. 15, 2021

(54) METHOD FOR MANAGING THE VALIDATION OF MESSAGES RELATING TO A MESSAGE CHAIN INDIVIDUALLY VIA A DECENTRALISED VALIDATION NETWORK

(71) Applicant: Sebastien Dupont, Rainneville (FR)

(72) Inventor: Sebastien Dupont, Rainneville (FR)

(*) Notice: Subject to any disclaimer, the term of this patent is extended or adjusted under 35 U.S.C. 154(b) by 193 days.

(21) Appl. No.: 16/133,989

(22) Filed: Sep. 18, 2018

(65) Prior Publication Data
US 2019/0044735 A1 Feb. 7, 2019

Related U.S. Application Data

(63) Continuation of application No. PCT/FR2017/000054, filed on Mar. 21, 2017.

(30) Foreign Application Priority Data

Mar. 21, 2016 (FR) .................................. 1600470

(51) Int. Cl.
*H04L 29/06* (2006.01)
*H04L 9/32* (2006.01)
(Continued)

(52) U.S. Cl.
CPC ............ *H04L 9/3247* (2013.01); *G06F 21/32* (2013.01); *G06F 21/606* (2013.01);
(Continued)

(58) Field of Classification Search
CPC ....... H04L 9/14; H04L 9/3247; H04L 9/3231; H04L 9/123; H04L 9/0861; H04L 9/30; H04L 63/123; G06F 21/606; G06F 21/32
See application file for complete search history.

(56) References Cited

U.S. PATENT DOCUMENTS 7,447,904 B1* 11/2008 Boggs .................. H04L 9/3236
713/155
10,158,480 B1* 12/2018 Winklevoss ........ H04L 12/2803
(Continued)

OTHER PUBLICATIONS

Satoshi Nakamoto, "Bitcoin: A Peer-to-Peer Elecronic Cash System," Oct. 31, 2008, XP055131503, Retrieved from the Internet: URL:https://bitcoin.org/bitcoin.pdf [retrieved on Jul. 24, 2014].
(Continued)

*Primary Examiner* — Sher A Khan
(74) *Attorney, Agent, or Firm* — Blueshift IP, LLC; Robert Plotkin (57) ABSTRACT

The invention relates to a method for validating message strings through a decentralized network. Said method also makes it possible to manage the validations of messages relating to a message chain in a unitary and asynchronous manner thus rendering the process unlimited in terms of performance. The method also allows enhanced security and confidentiality, in particular by integrating the number and geolocation constraints of message validations. The method thus makes it possible, through a decentralized network of trusted third parties with limited confidence, to restore real trust to the users.

13 Claims, 5 Drawing Sheets

(51) Int. Cl.
    *G06F 21/60*     (2013.01)
    *G06K 9/00*     (2006.01)
    *G06F 21/32*     (2013.01)
    *H04L 9/14*     (2006.01)
    *H04L 9/08*     (2006.01)
    *H04L 9/30*     (2006.01)

(52) U.S. Cl.
    CPC ........ *G06K 9/00885* (2013.01); *H04L 9/0861* (2013.01); *H04L 9/0866* (2013.01); *H04L 9/14* (2013.01); *H04L 9/30* (2013.01); *H04L 9/3231* (2013.01); *H04L 63/123* (2013.01); *G06F 2221/2107* (2013.01)

(56) References Cited

U.S. PATENT DOCUMENTS

| | | | | |
|---|---|---|---|---|
| 2001/0032314 | A1* | 10/2001 | Ansper | H04L 9/3247 713/176 |
| 2009/0313171 | A1* | 12/2009 | Yacobi | H04L 9/3247 705/51 |
| 2014/0006778 | A1* | 1/2014 | Dixon | H04L 63/08 713/168 |
| 2015/0332283 | A1* | 11/2015 | Witchey | G06Q 50/22 705/3 |
| 2016/0283941 | A1* | 9/2016 | Andrade | H04L 9/3247 |
| 2016/0342989 | A1* | 11/2016 | Davis | G06Q 20/3674 |
| 2017/0039330 | A1* | 2/2017 | Tanner, Jr. | G06F 19/328 |
| 2017/0046651 | A1* | 2/2017 | Lin | H04L 9/0861 |
| 2017/0132625 | A1* | 5/2017 | Kennedy | G06F 16/2379 |
| 2017/0132626 | A1* | 5/2017 | Kennedy | G06Q 20/401 |
| 2017/0180134 | A1* | 6/2017 | King | H04L 63/0853 |
| 2017/0344988 | A1* | 11/2017 | Cusden | G06F 21/00 |
| 2017/0352027 | A1* | 12/2017 | Zhang | G06Q 20/065 |
| 2017/0366348 | A1* | 12/2017 | Weimer | H04L 9/3236 |
| 2018/0025166 | A1* | 1/2018 | Daniel | G06F 9/5011 713/189 |
| 2018/0227293 | A1* | 8/2018 | Uhr | H04L 9/3263 |
| 2018/0341775 | A1* | 11/2018 | Gisolfi | G06F 21/6245 |
| 2018/0343120 | A1* | 11/2018 | Andrade | H04L 9/0866 |
| 2019/0019183 | A1* | 1/2019 | Karame | H04L 9/30 |
| 2019/0044735 | A1* | 2/2019 | Dupont | G06F 21/606 |
| 2019/0081790 | A1* | 3/2019 | Mandal | H04L 63/0428 |
| 2019/0173890 | A1* | 6/2019 | Deka | H04L 63/08 |
| 2019/0199535 | A1* | 6/2019 | Falk | H04L 9/0643 |
| 2019/0207768 | A1* | 7/2019 | Hardy | H04L 63/123 |
| 2019/0229911 | A1* | 7/2019 | Allen | G06Q 20/3829 |
| 2019/0347444 | A1* | 11/2019 | Lowagie | G06F 21/31 |
| 2020/0076612 | A1* | 3/2020 | Adluri | H04L 9/3247 |
| 2020/0084026 | A1* | 3/2020 | Reading | H04L 9/3247 |
| 2020/0084046 | A1* | 3/2020 | Bessonov | H04L 9/3239 |

OTHER PUBLICATIONS

Law et al., "How to Make a Mint: The Cryptography of Anonymous Electronic Cash," internet article, Jun. 18, 1996, XP002773897, National Security Agency Office of Information Security Research and Technology, Retrieved from the Internet: URL:http://groups.csail.mit.edu/mac/classes/6.085/articles/money/nsamint/nsamint.htm [retrieved on Sep. 19, 2017].

Nicolas van Saberhagen, "CryptoNote v 2.0," inernet article, Oct. 2013, XP002773898, Retrieved from the Internet: URL: https://cryptonote.org/whitepaper.pdf [retrieved on Sep. 19, 2017].

Carter Graydon, "Bitcoin's Future: Proof-of-stake vs Proof-of-work," internet article, Aug. 30, 2014, XP002773899, Retrieved from the Internet: URL:https://www.cryptocoinsnews.com/bitcoins-future-proof-of-stake-vs-proof-of-work/ [retrieved on Sep. 19, 2017].

P. Estevao, "What is Proof of Work," internet article, Jun. 18, 2015, XP002773900, Retrieved from the Internet: URL: https://www.bitcoinmining.com/what-is-proof-of-work/ [retrieved on Sep. 19, 2017].

* cited by examiner

Fig.1 receiving devices

METHOD FOR MANAGING THE VALIDATION OF MESSAGES RELATING TO A MESSAGE CHAIN INDIVIDUALLY VIA A DECENTRALISED VALIDATION NETWORK

INTRODUCTION

The present invention relates to the field of message strings. More particularly, the invention relates to means for validating said message chains, particularly adapted to secure transactions, without disclosure, through a decentralized computer network. This invention incorporates the notion of message chains, which in contrast to current technologies, including those based on centralized databases whether they are distributed or not, which although gaining performance are irremediably limited by their centralized nature. Other methods for overcoming these limitations are thus known. In particular, it is possible, via blockchain technology—more generally referred to as the "Blockchain" to validate blocks of transactions through a decentralized network. Nevertheless with this type of technology it is not possible to validate transactions one by one.

This technology makes it necessary to process the validation of transactions by message blocks, which has the consequence of generating a high latency on the transaction validation and therefore significantly reducing the ability of this technology to process a large number of transactions in parallel, each block having a limited size and requiring a time set by complexity to solve a calculation. In addition, this technology "burns" a lot of energy, both by the complex calculations it requires, but also by the very large number of unnecessary validations, in fact a single validation device can validate a transaction block. This is why there is a need for message chain management means allowing both reliance on validation devices across a decentralized network, but also allowing message validation of a message chain. no longer in blocks, but in a unitary way.

An object of the invention is to provide means for managing the validations of messages relating to a message chain in a unitary manner through a decentralized validation network. Another object of this invention is to rely on the NoSQL database mechanism to introduce the concept of "referent" nodes to a given transaction chain thus enabling a unit message to be validated on a planetary decentralized network and to instant way. Another object of this invention is to provide a new mechanism for validating message chains independently of each other and thus to make the process unlimited in terms of performance. Another object is to provide enhanced security and privacy for users of this technology. Another object is to allow validation complexity that is all the more important that the messages to be validated have a high criticality, this complexity is managed both by the number of validations required for a given message, but also in terms of the geographical distribution of the messages. validations.

Another object of this invention is to be able to transparently process data hosted by external devices. Finally, perhaps the most important object of this invention is to rely on a decentralized network of trust-limited trusted third parties who both possess the necessary knowledge to validate the messages, but who, by transparency of the process can give a real confidence to users.

SUMMARY

Thus an embodiment provides a method implemented in a network, able to implement a message chain protocol, comprising at least one transmitting device and at least a first and at least a second receiver device adapted for performing cryptographic calculations, characterized in that it comprises the following steps:

a first step where at least one transmitting device transmits at least a first message to at least one first receiving device comprising:
  at least one key control (CC_IDA2) generated from a second cryptographic key and;
  at least one public key (CPUB_IDA1) generated from a first cryptographic key and;
  At least one data area (DATA) and;
  at least one first cryptographic signature (SIG_IDA1) generated by calculating and encrypting the content control key of the at least one first message with the first cryptographic private key and;
  At least one second cryptographic signature (SIG_DISPEM) generated by calculating and encrypting the content control key of the at least one first message with the cryptographic private key associated with the transmitting device.

A second step where at least a first receiving device of the at least one first message performs the following operations:
  checks the concordance between at least one public key (CPUB_IDA1) and a cryptographic signature (SIG_IDA1) of the at least one first message and;
  verifies the concordance between the at least one second cryptographic signature of the device (SIG_DISPEM) and a list of cryptographic public keys previously known by at least one receiving device and associated with the sending devices and;
  calculates the public key (CTRL_PUBU) corresponding to the signature of said sending device (SIG_DISPEM) from public cryptographic keys previously known by at least one receiving device and associated with the sending devices and;
  generates at least a second validation message associated with said at least one first message and comprising at least:
    the calculated control key of the content of the at least one first message (SIG_MSG) and;
    the control key (CTRL_PUBU) associated with the cryptographic public key which made it possible to verify the signature of said transmitting device (SIG_DISPEM) and;
    a status code relating to the validity of said at least one first message (STATUS) and;
    A public key (PUB_ROBOT) of said at least one first receiving device generated from at least one cryptographic key specific to the at least one first receiving device and;
    the cryptographic signature (SIG_ROBOT) generated by calculating and encrypting the content control key of the at least one first message and the content of the at least one second message with the cryptographic private key associated with the at least one first receiving device and;
  Broadcast the first and the second message to at least a second receiver device.

A third step, wherein at least a second receiving device of said at least one first and at least one second message transmitted by the at least one first receiving device performs the following operations:
  checks the concordance between at least one public key (CPUB_IDA1) and a cryptographic signature (SIG_IDA1) of the at least one first message transmitted by the transmitting device and;

verifies the concordance between the signature (SIG_ROBOT) and the cryptographic public key (PUB_ROBOT) of said first receiving device and;

verifies the correspondence between the signature of the at least one first message of the sending device (SIG_DISPEM) and the calculated public key (CTRL_PUBU) by the at least one first receiving device and;

checks the consistency of the status code (STATUS) and;

generates at least a third validation message associated with the at least one first and the at least one second message comprising:

the control key (SIG_MSG) calculated from the contents of the at least one first message and;

the control key (CTRL_PUBU) associated with the cryptographic public key having made it possible to verify the signature of said at least one transmitting device (SIG_DISPEM) and;

a status code relating to the validity of said at least one first message (STATUS) and;

a public key (PUB_ROBOT2) of said at least one second receiver device generated from at least one cryptographic key specific to said at least one second receiver device and;

The cryptographic signature (SIG_ROBOT2) generated by calculating and encrypting the content control key of the at least one first message and the content of the at least one second message with the cryptographic private key associated with the at least one second receiving device.

According to one embodiment, the method is able to connect at least one first message to at least one second message via at least two control keys, a public key and a signature, the method being characterized in that said at least one second message comprises:

at least one control key (CC_IDA2) generated from a second cryptographic key and;

at least one control key (CC_IDA1), at least one public key (CPUB_IDA1) and at least one signature (SIG_IDA1) of the at least one first message generated from a first cryptographic key and;

The signature (SIG_IDA1) being generated by calculating the control key of the content of the second message and encrypting the result with the first cryptographic private key.

According to one embodiment, the method is able to implement a decentralized peer-to-peer network, comprising at least a first and a second receiver device adapted to store data and a list of at least one device. receiver of said decentralized peer-to-peer network, characterized in that it comprises the following steps:

a first step where at least a first receiving device interrogates at least a second receiver device of said peer-to-peer network in order to recover the listing at least one receiving device of said distributed peer-to-peer network;

a second step where said first receiving device retrieves the data coming from the at least one receiving device of said decentralized peer-to-peer network from the list of the at least one device receiving said decentralized peer-to-peer network;

a third step where said first receiver device registers with the at least one receiver device of said peer-to-peer distributed network as a new receiver device of said peer-to-peer distributed network;

A fourth step wherein said first receiving device makes available to at least one other receiving device said list of at least one receiving device of said peer-to-peer distributed network as well as the data coming from the at least one receiving device of said network decentralized peer-to-peer.

According to one embodiment, the method is able to transmit at least one message to at least one receiving device of said peer-to-peer distributed network, characterized in that it comprises the following steps:

a first step where at least one transmitting device interrogates at least one receiving device of said peer-to-peer distributed network in order to retrieve the list of at least one receiving device of said peer-to-peer distributed network;

a second step in which said transmitting device transmits at least one message to at least one receiving device listed in said list of at least one receiving device of said decentralized peer-to-peer network.

According to one embodiment, the method is able to identify at least one referent receiver device (7) relating to at least one information item of at least one message characterized in that it makes it possible to identify the at least one referent device (7) from:

at least one information contained in said at least one message and;

at least one message distribution algorithm and;

and at least one list of at least one receiving device.

According to one embodiment, the method is able to validate and transmit at least one message to at least one referent receiver device (7), characterized in that it comprises the following steps:

the at least one receiving device after receiving said at least one message:

verifies the validity of said at least one message and calculates the referent receiver device (7) relating to the control key of said at least one message;

generates at least one validation message associated with said at least one message;

diffuses said at least one message and said at least one validation message to said at least one referent receiver device (7) relating to the control key of said at least one message.

According to one embodiment, the method is characterized in that it further comprises at least one database.

According to one embodiment, the method is capable of storing and replicating at least one message in at least one database of at least one receiving device according to a data distribution algorithm, the method being characterized in that said at least one receiving device identifies for said at least one message at least one database and at least one receiving device as a function of:

at least one piece of information relating to said at least one message;

according to at least one data distribution algorithm and;

According to at least one list of at least one receiving device.

According to one embodiment, the method is adapted to connect at least one message to at least one message chain via at least one validation message of at least one receiving device, characterized in that comprises the following steps:

a first step where at least one receiving device:

validates that at least a second message having control key (CC_IDA2) is connected to at least a first message having control key (CC_IDA1) by checking the consistency between the control key (CC_IDA1), the public key (CPUB_IDA1) and the signature (SIG_IDA1) indicated in the at least one second message and;

calculates the public key (CTRL_PUBU) corresponding to the private key of the transmitting device which made it possible to generate the signature (SIG_DISPEM) of the at least one second message.

a second step or said at least one receiving device adds at least one validation message to said at least one second message comprising the following information:

information relating to said message (PREMSG_VALID) comprising:
  the list (LIST_VALID) of at least a receiver device having previously validated said at least one first message and;
  The control key (SIG_MSG) of the content of the second message and;
  a data area (DON) and;
  said public key (CTRL_PUBU) corresponding to the signature of the sending device (SIG_DISPEM) of the at least one second message.

information relating to the validation of said at least one receiving device (VALID_ROBOT) comprising:
  the status (STATUS) of the validation of said receiving device and;
  the public key associated with said at least one receiver device (PUB_ROBOT) and;
  the cryptographic signature (SIG_ROBOT) generated by calculating and encrypting the content control key of the at least one second message with the cryptographic private key associated with the at least one receiving device.

According to one embodiment, the method is able to independently and asynchronously validate at least one message from at least one message chain, characterized in that it comprises the following steps:

a first step where the at least one first receiving device, valid, identifies the referent receiver device (7) relating to the at least one first message, and:
  generates a message (PREMSG_VALID) and;
  generates a message (VALID_ROBOT) attesting the validation of said at least one first message and;
  diffuse at least one referent receiver device:
    said at least one first message;
    the message (PREMSG_VALID) and;
    and the message (VALID_ROBOT).

a second step where at least one second receiving device, valid, identifies the referent receiver device (7) relating to said at least one first message, and: generates a message (PREMSG_VALID) and;
  generates a message (VALID_ROBOT) attesting to the validation of said at least one first message and;
  diffuse at least one referent receiver device:
    said at least one first message;
    the message (PREMSG_VALID) and;
    and the message (VALID_ROBOT).

a third step where said at least one referent receiving device relating to the at least one first receives said at least one transmitted message, the message (PREMSG_VALID) and the message (VALID_ROBOT) of at least one receiving device and:
  stores said at least one first message transmitted only if it is not already stored and otherwise verifies that it is concordant with said at least one previously stored first message and;

stores said message (PREMSG_VALID) only if said message (PREMSG_VALID) is not already stored and otherwise verifies that it is concordant with said at least one message (PREMSG_VALID) previously stored and;

stores said message (VALID_ROBOT) only if said message (VALID_ROBOT) is not already stored.

A fourth step where at least one receiving device receives at least a second message having the control key (CC_IDA2) and whose previous control key indicated (CC_IDA1) corresponds to the control key of said first message, and performs the following operations:
  identifies the at least one referent receiver device (7) of the at least one first and at least one second message and;
  retrieves said at least one first message, the message (PREMSG_VALID) and the set of messages (VALID_ROBOT) from said at least one referent receiver device (7) of said at least one first message and;
  verifies the validity of each of the messages and the compliance criteria relating to the receiving devices having generated a validation message (VALID_ROBOT) and;
  only if the compliance criteria are met:
    generates a message (PREMSG_VALID) and a validation message (VALID_ROBOT) relating to the at least one second message and;
    diffuse at least one second message, the message (PREMSG_VALID) and the message (VALID_ROBOT) to said at least one referent receiver device relating to the at least one second message.

According to one embodiment, the method is adapted to validate at least one message from at least one message chain, taking into account the geographical position of at least one other receiving device having previously validated said message, characterized by the steps following:

at least one receiving device receives at least a second message having the control key (CC_IDA2) and whose previous control key indicated (CC_IDA1) corresponds to the control key of at least a first message, and performs the following operations:
  identifies the at least one first referent receiver device (7) relating to said at least one first message and;
  identifies the at least one second referent receiver device (7) relating to said at least one second message and;
  retrieves the message (PREMSG_VALID) and the set of messages (VALID_ROBOT) relative to said at least one first message from said at least one first referent receiver device (7) of said at least one first message and;
  verifies the validity of each of the messages (PREMSG_VALID) and (VALID_ROBOT) and the geographical position of each of the at least one receiving device at the origin of at least one validation message (VALID_ROBOT) of the at least one first message and;
  only if the compliance criteria relating to the geographical position of the at least one receiving device having generated a validation message (VALID_ROBOT) are met:
    generates a message (PREMSG_VALID) containing the list (LIST_VALID) of the at least one receiving device at the origin of a validation message relating to said first message and fulfilling the conformity criteria relating to the geographical position of the at least one receiving device that generates a validation message relating to said first message and;

generates a validation message (VALID_ROBOT) relating to said at least one second message and;

and diffuses to the at least one second referent receiver device (7) relating to the second message:

said at least one second message and;

the associated message (PREMSG_VALID) and;

and the associated message (VALID_ROBOT).

According to one embodiment, the method is adapted to validate a message in a message chain, taking into account the number of receiving devices having previously validated said message, the method being characterized in that it comprises the following steps:

at least one receiving device receives at least one second message having the control key (CC_IDA2) and whose previous control key indicated (CC_IDA1) corresponds to the control key of at least one first message, and carries out the operations following:

identifies the at least one first referent receiver device (7) relating to said at least one first message and;

identifies the at least one second referent receiver device (7) relating to said at least one second message and;

recover the message (PREMSG_VALID) and all the messages (VALID_ROBOT) relating to said at least one first message from said at least one first referent receiver device of said at least one first message and;

verifies the validity of each of the messages (PREMSG_VALID) and (VALID_ROBOT) and the number of receiving devices at the origin of at least one validation message (VALID_ROBOT) of said first message and;

only if the compliance criteria relating to the number of receiving devices having generated a validation message (VALID_ROBOT) are gathered:

generates a message (PREMSG_VALID) containing the list (LIST_VALID) of the at least one receiving device causing a validation message relating to said first message and satisfying the conformance criteria relating to the number of receiving devices causing a validation message relating to said first message and;

generates a validation message (VALID_ROBOT) relating to said at least one second message and;

diffuses to the at least one second referent receiver device (7) relating to the second message:

said at least one second message and;

the associated message (PREMSG_VALID) and;

the associated message (VALID_ROBOT).

BRIEF DESCRIPTION OF THE FIGURES

Other features and advantages of the present invention will be apparent from the following description of embodiments with reference to the accompanying drawings, in which.

DETAILED DESCRIPTION

Figure 1:
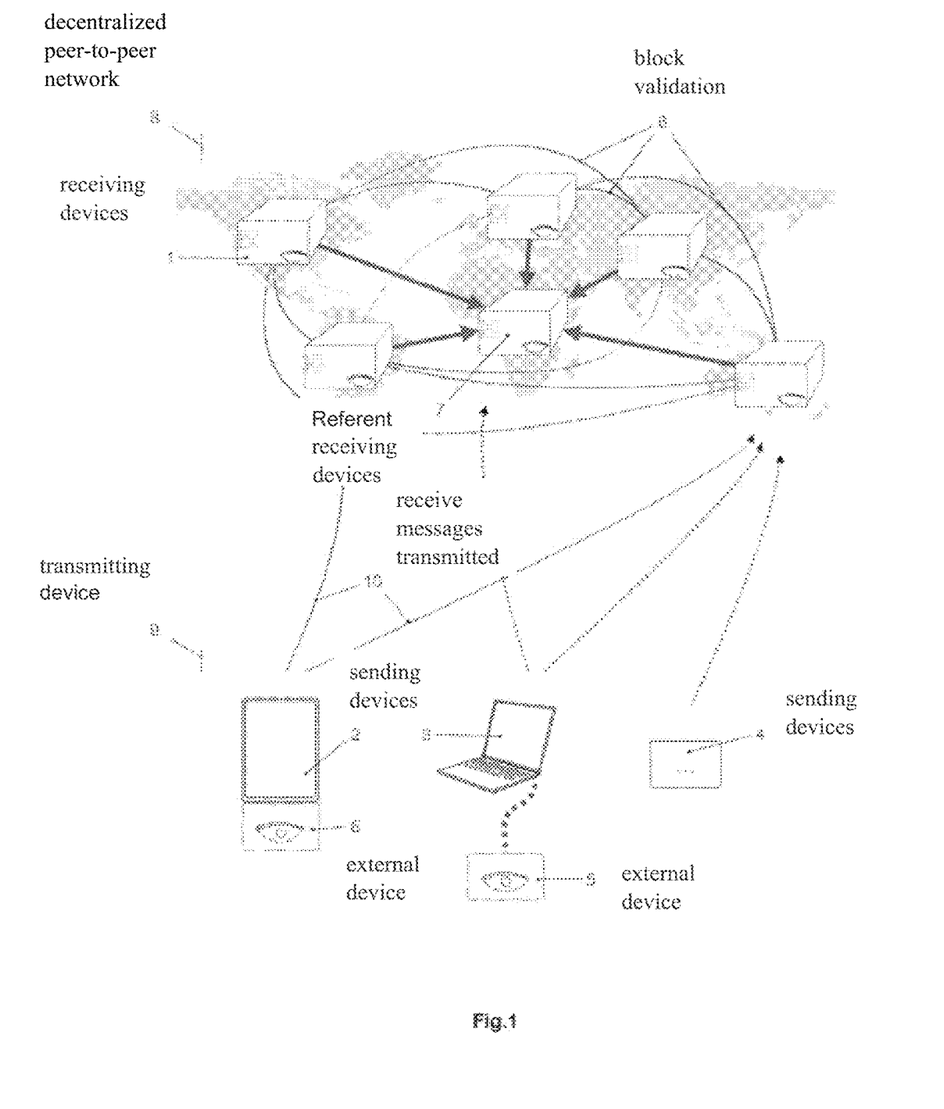
FIG. 1 schematic view of the transmission and the validation of a message comprising transmitting devices (2), (3) and (4) and receiving devices (1) and (7) integrated in a decentralized peer-to-peer network (8) according to one embodiment of the invention.

Referring in particular to FIG. 1, a method implemented in a network comprising at least one transmitting device (9) and at least one first and one second receiving device (1), all adapted to realize Cryptographic calculations will now be described.

The invention is composed on the one hand of sending devices (2), (3) and (4) adapted to transmit and retrieve messages to and from the receiving devices (1). The messages are stored through message chains themselves stored on databases hosted by the receiving devices implemented in a decentralized peer-to-peer network (8).

In the remainder of the description, the following points will be addressed to which the invention responds: how to ensure the replication of data on the entire planet in order to overcome any disaster that could affect one or more continents?

How can this decentralized system be assured that it can rely on a maximum of small nodes rather than a handful of data centers that would create a security flaw in the system? How to cover the costs of electricity and networks that would have an individual who would like to host a node? How to minimize the power consumption associated with message validation, and how can the validation of messages really be useful to the system? How to allow a system planned to accommodate the entire population of the planet to optimize the data that must pass through the network to cover the regions that are most deprived of it? How to guarantee the real confidentiality of transactions even though all transactions will be public? How to guarantee that the device can survive the arrival of the hypothetical quantum computer?

Figure 2:
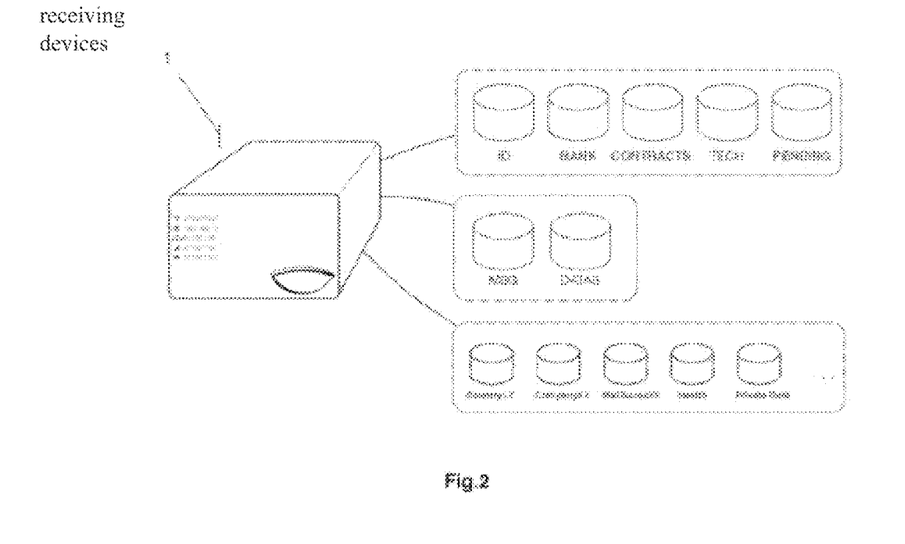
FIG. 2 schematic view of the databases hosted by the receiving devices according to one embodiment of the invention.
Figure 3:
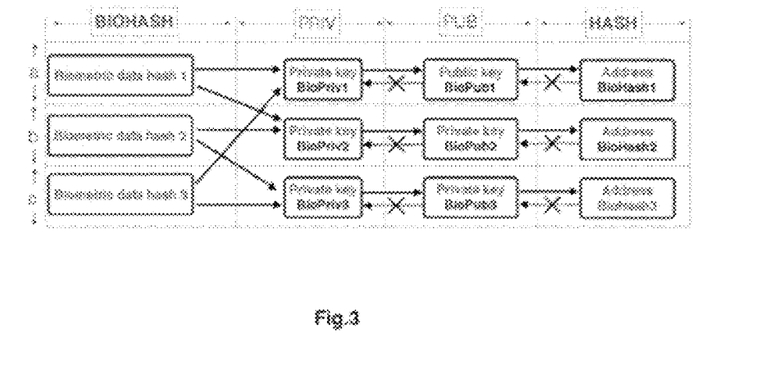
FIG. 3 schematic view of the link between biometric keys, cryptographic private keys, cryptographic public keys and control keys according to one embodiment of the invention.

The receiving devices (1), according to one embodiment, each host a first group of NoSQL-type databases, the messages are thus accessible through a decentralized peer-to-peer network of NoSQL-type databases. databases relate to a specific use, but remain associated with each other—FIG. 2:

identity database (ID): relating to messages specific to digital identities for example of an individual, an object, a group of individuals, storing biometric data, but also messages relating to a digital identity from any external base.

contract database (CONTRATS): relating to the messages specific to the management of intelligent contracts, putting into play specific identity identities for identities stored in the database (ID), external digital identities, device rules transmitters and receivers, but also intelligent contract messages from any external base.

A meta-database (BANQ): for storing the values relating to the identity messages, to the contract messages, but also to the messages originating from any external base.

technical basis (TECH): for storing the technical data necessary for the operation of the entire system, for example the list and distribution of the nodes of the peer-to-peer network, the various messages making it possible to renew the keys of the different devices.

basis of transactions pending or refused (ATTENTKO): this database is related to messages waiting or refused on the whole system, it stores messages waiting for example in the context of the notification of the issuer or the recipient during a transfer of values.

The peer-to-peer network or—more generally referred to as the Anglo-Saxon peer-to-peer network—is the keystone of any decentralized system. The message strings as used in this invention use this type of network to share the information and all the resources of this system. The nodes of these networks are carried by the receiving devices (1) which in addition to the validation of messages ensure the storage and dissemination of information wherever the receiving devices (1) are connected to the network—FIG. 1. In the context of a message sent by a transmitting device, the transmitting device will therefore not contact a particular receiving device (1), but any receiving device (1) for validating the message, the device receiver (1) will directly process the validation of said message or propagate it to a referent receiver device (7) in particular.

The unresolved issues to date on decentralized networks are; management of data distribution and validations across nodes, organization of data to allow each node to validate/disprove a message without having to modify everything, control of latency so that a message can be validated on both sides of the planet, the organization of data to prevent a device from downloading several messages of a chain to consult for example its portfolio of values and without going through a centralized service, the distribution of data so that all the data is not replicated on all the nodes and thus optimize the occupation rate of the disks and significantly increase the overall acceptable size.

These problems are solved by this invention, in particular by the use of a "column oriented" type NoSQL database that is particularly efficient for this type of decentralized system. This database will contain, for example, 5 database schemas, each of which may have a different replication strategy—the division of the databases makes it possible to apply different replication strategies according to at least one primary key. The data relating to the storage of values, materialized by the database (BANQ), must for example be replicated on all the nodes to ensure maximum availability. However, the messages relating to the biometric identity data may be distributed less systematically, the need for a user to access them quickly (collocation on several nodes nearby), and some other nodes further to ensure data persistence even in the event that a country loses its Internet connection and/or its electricity network as is regularly the case in many developing countries. One of the particularly interesting features in this type of database is the indexing of the nodes according to the address of the primary key. By this means, it is therefore possible for each node, or receiver device (1) within the scope of this invention, to know the "referent" receiver device(s) (7) for a specific datum. Thus, the problem of "planetary" validation by message is solved by the prior knowledge of referent receiver devices (7) in charge of these specific messages.

Smart contracts, also known as "smart-contract" as defined in this invention, represent programs whose execution is controlled and verifiable, designed to execute the terms of a contract automatically. when certain conditions are met.

Also, and to solve the problem of" individual point of failure "known as the Anglo-Saxon" Single Point of Failure", the configuration of the databases will not be done centrally, but directly by algorithms published on the technical data basis (TECH), each new receiving device (1) which will register in the system will then be automatically and dynamically assigned a role known and shared with the other receiving devices (1).

Figure 4:
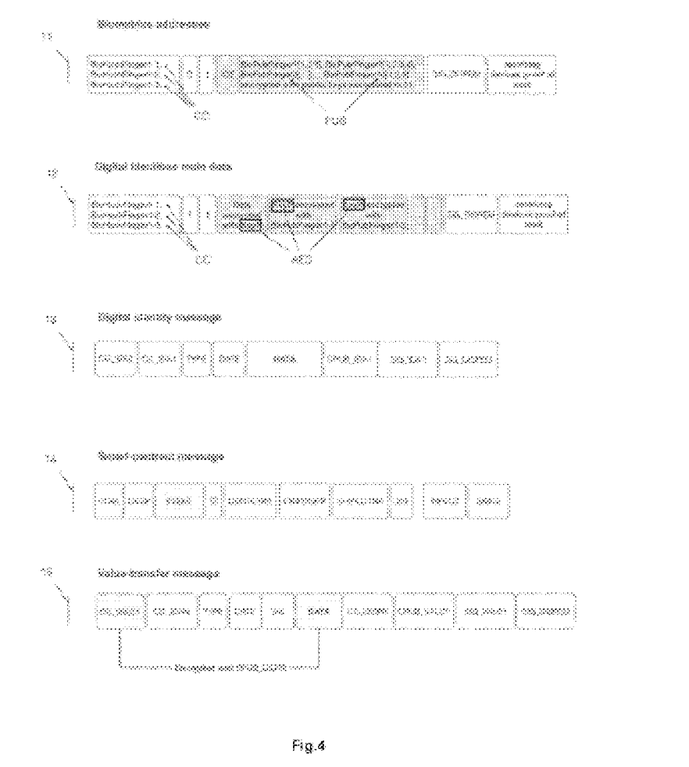
FIG. 4 schematic view of the messages transmitted by the emitting devices (2) (3) and (4) according to one embodiment of the invention.

FIG. 4 represents a series of messages intended for the databases relating to the receiving devices:

(11): a message making it possible to link biometric keys to a main digital identity
(12): a message relating to a digital identity principal
(13): a message relating to a digital identity
(14): a message relating to a smart contract
(15): a message relating to a transfer of values Once a message has been transmitted, it is then checked and validated or not by the receiving devices which add a validation message connected to said transmitted message. The capacity of the column-oriented database makes perfect sense in FIG. 4, where each column (CC), (PUB) . . . must be able to contain an infinity of columns (BioPubDoigt1 [1,2,3], BioPubDoigt2 [1, 2,3, 4] . . . or BioHashDoigtl-1, BioHashDoigtl-2 . . . ), in practice there will be potentially as many columns relating to the validation messages of the receiving devices as of the receiving devices, these columns are also called "supercolumns".

For the understanding of the following paragraphs, it should be noted that the mining work is a fundamental step of the blockchain technologies more generally designated by the Anglo-Saxon term "Blockchain", indeed, it is through the that each is validated and that the security of the network is ensured, because in each mining work the whole chain must be checked, if a transaction is added or modified then it is the whole branch of the chain that is denied. In the context of this invention, the mining work is performed by receiving devices, or more precisely autonomous software agents also called "Iris Robots" (1) which will respond to calls for tenders (mining is one) which are published in the contract databases (CONTRATS) and technical data (TECH). The Iris Robots accept or not this tender according to the proposed remuneration and with the obligation to execute the contract and to follow the general rules of the system (which is constantly checked by the other Iris Robots). In the unlikely event of a "crazy minor robot", the other minor robots never use the blocks it generated and revoke it from the list of Iris Robots empowered by the device. Iris robots (1) are the trusted third parties of this network, but with limited confidence, since each transaction will have to be proven since its origin.

Mining is the great revolution integrated in blockchain protocols, this device makes it possible to manage the security of a distributed network through the mining work which, at the same time, validates each block of transactions, but where each miner also watch from the beginning that each block of a string is valid and linked to the previous one. Nevertheless, this "really democratic" system poses three major problems:

the attack of 51%, which consists for the attacker to provide 51% of the available resources and therefore statistically and temporarily to have the virtual monopoly on block validation (6 transactions statistically to be certain that a transfer of bitcoin (cryptocurrency working through a decentralized network) is well integrated in the main chain).

second problem, more perverse this one, which is the emergence Dedicated mining calculation centers have the effect of annihilating the interest for a user to take part in the mining network which is catastrophic for the security of the system which is found in the problems of centralized systems.

Although proof of work is necessary to verify the actual work of a minor, the current operation of solving mathematical problems "burns energy" without being useful to the system. This invention focuses particularly on this point so that the proof of work is really useful to the system as a whole.

Finally, all the current systems based on a Blockchain technology uses blocks containing several transactions, which has the effect of making the system slow (on average 10 minutes) for the actual validation of a transaction. this operation has the effect of rendering part of the mining work unnecessary, since using, for example, already validated transactions, one of the last major drawbacks of this block validation and of requiring a given user to download all the blocks to know the state of his accounts (except to go through a centralized system that does the work for him, but centralizes the system again).

The mining system proposed in the context of this invention is therefore:

To guarantee a transparent execution of the rules or mining contracts by the publication of at least one contract in the technical data database (TECH);

To control the distribution of the "right of mining" so as not to annihilate the interest of the greatest number to participate in the security of the network (with an equal distribution of the gains for all the robots (1) which contribute to the validation of the messages, in other words, the technical chain (TECH) will integrate an algorithm which limits the number of robots (1) so that it remains permanently profitable for those who host it;

work, the verification of the public keys associated with the private keys used for the signature of the authorized issuing devices. The job of indicating the control key of said public key associated with the signature used by said sending device (the list of public keys relating to the authorized devices being stored on the technical basis (TECH)). This method makes it possible to add additional security and confidentiality while controlling the size of the data of the validation messages;

To validate each message one by one in place of a message block validation, each message is thus associated with at least one validation message generated by at least one receiving device or Iris robot, the succession of validated messages associated with a key of control relative to a previous message will thus represent a message chain, in addition the mechanism of distribution of messages associated with referent receiver devices—FIG. 1—(7) will have the major advantage to make the system asynchronous and thus to allow an unlimited number of validations of simultaneous messages;

Finally the operation of Iris Robots (1) will have the double advantage of proving both the validity of the messages, but also to prove the replication of message storage.

The operation of the Iris Robot (1) is therefore an essential link of the system, this autonomous software robot has functionalities allowing it to be the trusted third trusted limited all the methods described in this invention. The Iris Robots (1) integrate a set of cryptographic keys stored in a cryptoprocessor, allowing it both to identify itself on the network, to renew its keys, but also to provide the necessary computing power while allowing the lowest power consumption possible. The private keys of the Iris robots (1) are generated directly by said cryptoprocessor so as never to leave the sequestration zone, thus enabling them to guard against any software or hardware attack. To ensure planetary replication of the data, this integrates a GPS chip that makes it possible to determine, for example, within 50 km the position of the robot (which is also verified by the network latency between the different robots). Only the operation of the NoSQL database requires more resources that are provided by embedded devices such as those integrated in the "Internet box", "Raspberry PI" or smart mobile phones.

Figure 5:
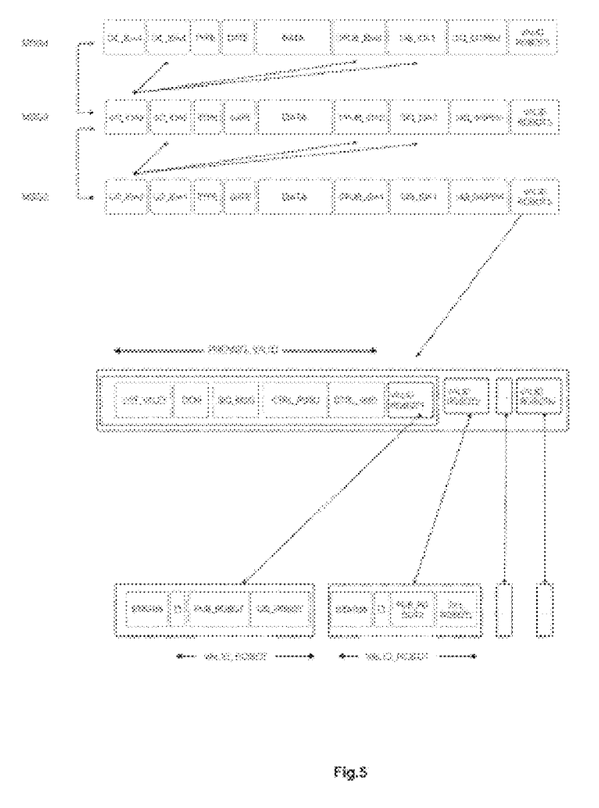
FIG. 5 schematic view of the contents of a message transmitted by a transmitting device accompanied by validation messages of the receiving devices according to one embodiment of the invention.

The work carried out by at least one Iris robot is as follows:

receive messages transmitted (10) by the sending devices (9);

propagate said transmitted messages to the referring robots (7);

verify that the signature of the transmitting device (SIG_DISPEM) is valid and that it corresponds to at least one of the public keys listed in the list of public keys corresponding to the authorized transmitting devices;

if the message is not yet associated with a validation message on the referring robot associated with the control key relating to the message, then said robot will generate a message (PREMSG_VALID)—FIG. 5—to which it will associate a validation message (VALID_ROBOT), otherwise said robot will check the message (PREMSG_VALID) and if the result is consistent with its calculations, it will then add an additional message (VALID_ROBOT), otherwise, if the data are not correct said robot will alert other robots via the base (TECH).

FIG. 5 represents the materialization of the proof of work of a robot, the first validation message (PREMSG_VALID) (FIG. 7) comprises the following data:

(LIST_VALID): this zone lists the public keys of the robots having validated the previous message, only the necessary number of robots is mentioned and in order of date of validation;

(DON): data area encrypted or not with the public key of the shared key of the robots;

(SIG_MSG): the signature of the message including the validations messages of the robots mentioned in the zone (LIST_VALID);

(CTRL_PUBU): the control key corresponding to the public key used by the sending device to sign the message;

(CTRL_AMO): the control key corresponding for example to the public key used by the removable cryptoprocessor of the sending device to sign the message, this zone is encrypted with the public key of the shared key of the robots.

The message (VALID_ROBOT) contains the following data:
  (STATUS): containing the status code of the validation message;
  (D): containing the date of generation of the validation message;
  (PUB_ROBOT): zone containing the public key specific to the robot having validated the message;
  (SIG_ROBOT): signature associated with the validation message and associated with the public key of said robot.

It should be noted that the verification of the calculation is instantaneous for the robots that verify it, since the control key for the signature of the transmitting device is already indicated in the message (PREMSG_VALID) previously generated.

The alert message relating to an erroneous calculation or a non-compliance with the contract of a given robot is stored on the basis (TECH), a significant number of other robots will then have to confirm the error or fraud, if such a case were to occur the robot at the origin of the fraudulent message would then be revoked as well as the individual who would have registered it.

Since the geographical distribution of robots (1) is a fundamental element of network security, robots' compensation algorithms are focused on favoring Iris (1) receiving devices or robots, hosted by the largest number of individuals, for example by relying on the ability of issuing devices to certify the uniqueness of a digital identity.

The emitter device shown in FIG. 2 will for example display several performance indices, both to maximize the gains associated with the mining, but also to enable the various robots to be able to maximize the efficiency of their work, the performance indices displayed on the screen. the case are for example the network, the filling rate of the disks, the utilization rates of the microprocessor or memory. All of these indices aim to enable the entire network to function optimally.

Figure 6:
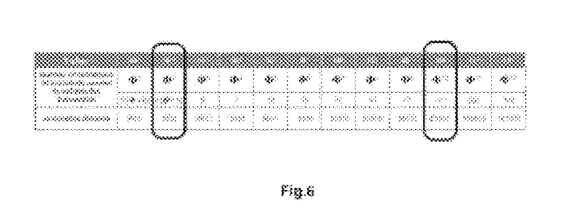
FIG. 6 schematic view of the number of validations of receiving devices to achieve according to the value indicated in a value transfer type message according to one embodiment of the invention.

To ensure greater security for the entire chain (in number of validations and also in number and distance of replications) and significantly increase the complexity of an attacker depending on the criticality of the message, the system will impose for example d as many as validations that the value (VAL) indicated in the message (15) will be high—FIG. 6, for example, to validate a message indicating a value of 0.0001 will require five validations or 5×500 km of distance whereas to validate a value of 100 it will for example 77 validations or 77×500 km or approximately the perimeter of the Earth cumulative distance.

To perform these operations without generating too much network latency and while ensuring a security all the more important that the criticality is high, which, in fact, is one of the major innovations of this invention, the validations are performed asynchronously. For example in the following manner—FIG. 7—the value transfer performed on the operation (TXN2), which has been validated by a sufficient number of robots during the operation (TXN1), can be used instantaneously to be transferred to the account 3", against the operation (TXN3), which has obtained only three validations of the five necessary, must wait for the validation of two additional robots on the message (TXN2) to be validated, no robot having the right, through intelligent contracts, to validate a message referring to a previous message that has not been validated.

Figure 7:
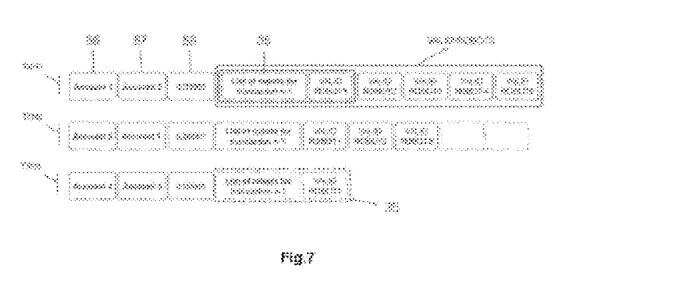
FIG. 7 schematic view of the asynchronous operation of the validations of the messages transmitted by the transmitting devices and validated by the receiving devices according to one embodiment of the invention.

It should also be noted in this example of FIG. 7, that the wait required to transfer the values of "account 3", only concerns the "account 3" and only if it has no other values than those mentioned in the example—FIG. 7. Full validation, for example up to 322 validations, is only required at the time of reuse of funds for other transactions.

Thus, not only the checks performed are even more important that the criticality of the message is high, but also, it is not necessary to wait for the validation of previous messages to process new messages. This makes it possible to authorize an almost unlimited number of simultaneous transactions, which at present does not exist, all the more so on value transfer messages.

It is the presence of the address of a robot in the list of robots listed that allows the remuneration of each, if the transaction is validated. Thus, to avoid the phenomenon of infinite validations, only the validations necessary and indicated in (LIST_VALID) will give rise to remuneration.

The invention claimed is:
1. A method implemented in a network, for managing a validation of a message chain protocol, comprising at least one transmitting device and at least a first and at least a second receiver device adapted to perform cryptographic calculations, characterized in that said method comprises the following steps:
  a first step where said at least one transmitting device transmits at least one first message to the at least one first receiver device, said first message comprising at least:
    at least one control key (CC_IDA2) generated from a second cryptographic key;
    at least one public key (CPUB_IDA1) generated from a first cryptographic private key;
    at least one data area (DATA);
    at least one first cryptographic signature (SIG_IDA1) generated by calculating and encrypting the control key (CC_IDA2), of the content of at least one first message with the first cryptographic private key;
    at least one second cryptographic signature (SIG_DISPEM) generated by calculating and encrypting the control key (CC_IDA2) of the content of at least one first message with a cryptographic private key associated with the transmitting device,
  a second step, where the at least first receiver device for receiving the at least one first message performs the following operations:
    checks the validity between the at least one public key (CPUB_IDA1) and the at least one first cryptographic signature (SIG_IDA1) of the at least one first message;
    verifies the validity between the at least one second cryptographic signature (SIG_DISPEM) of the device and a list of cryptographic public keys previously known by the at least one receiver device and associated with the at least one transmitting device and the at least one receiver device;
    calculates the public key (CTRL_PUBU) corresponding to the signature (SIG_DISPEM) of said transmitting device from said public cryptographic keys previously known by the at least one receiver device and associated with the transmitting devices;
    generates at least a second validation message associated with said at least one first message, said validation message comprising at least:
      a computed control key (SIG_MSG) of the content of the at least one first message;
      a control key (CTRL_PUBU) associated with the cryptographic public key which verifies the signature (SIG_DISPEM) of the transmitting device;

a status code (STATUS) relating to the validity of the at least one first message;

a public key (PUB_ROBOT) of the at least one first receiver device generated from the at least one cryptographic private key associated with the at least one first receiver device;

a cryptographic signature (SIG_ROBOT) generated by calculating and encrypting the control key; of the content of at least one first message and the content of at least one second validation message with the cryptographic private key associated with the at least one first receiver device; and broadcast the first and the second message to the at least one second receiver device, a third step, wherein the at least one second receiver device for receiving said at least one first and at least one second messages transmitted by the at least one first receiver device, performs the following operations:

checks the validity between the at least one public key (CPUB_IDA1) and the at least one first cryptographic signature (SIG_IDA1) of the at least one first message transmitted by the transmitting device;

checks the validity between the signature (SIG_ROBOT) and the cryptographic public key (PUB_ROBOT) of said first receiver device;

verifies the validity between the signature of the at least one first message of the transmitting device (SIG_DISPEM) and the calculated public key (CTRL_PUBU) by the at least one first receiver device;

checks the validity of the status code (STATUS);

generates at least a third validation message associated with the at least one first and the at least one second messages, said third validation message, comprising:

the control key (SIG_MSG) calculated from the content of the at least one first message;

the control key (CTRL_PUBU) associated with the cryptographic public key which verifies the signature (SIG_DISPEM) of said at least one transmitting device;

a status code (STATUS) relating to the validity of said at least one first message;

a public key (PUB_ROBOT2), of the at least one second receiver device generated from the at least one cryptographic key specific to said at least one second receiver device; and a cryptographic signature (SIG_ROBOT2) generated by calculating and encrypting the control key of the content of at least one first message and the content of at least one second message with the cryptographic private key associated with the at least one second receiver device.

2. The method as claimed in claim 1, which includes the steps of connecting the at least one first message to the at least one second message via the at least two control keys, the public key and the signature, the method being characterized in that the at least one second message comprises:

at least one control key (CC_IDA2) generated from the second cryptographic key and at least one other control key (CC_IDA1);

the at least one public key (CPUB_IDA1) and the at least one signature (SIG_IDA1) of the at least one first message generated from the first cryptographic private key; and the signature (SIG_IDA1) being generated by calculating the control key (CC_IDA1) of the content of the second message and encrypting the result with the first cryptographic private key.

3. The method as claimed in claim 1, adapted to implement a decentralized peer-to-peer network, comprising at least a first and a second receiver device adapted to store data and a list of at least one receiver device of said decentralized peer network pair, characterized in that said method comprises the following steps:

a first step where the at least first receiver device interrogates at least a second receiver device of said peer-to-peer distributed network in order to retrieve the list of at least one receiver device of said decentralized peer-to-peer network;

a second step wherein said first receiver device retrieves data from the cat least one receiver device of said peer-to-peer network from the list of at least one receiver device of said peer-to-peer distributed network;

a third step where said first receiver device registers with the at least one receiver device of said peer-to-peer distributed network as a new receiver device of said peer-to-peer distributed network; and a fourth step wherein said first receiver device makes available to at least one other receiver device said list of at least one receiver device of said peer-to-peer distributed network as well as the data coming from the at least one receiver device of said decentralized network peer-to-peer.

4. The method as claimed in claim 3, adapted to transmit at least one message to at least one receiver device of said peer-to-peer distributed network via at least one transmitting device, characterized in that said method comprises the following steps:

a first step where the at least one sending device interrogates the at least one receiver device of said peer-to-peer distributed network in order to retrieve the list of at least one receiver device of said peer-to-peer distributed network; and a second step wherein said transmitting device transmits at least one message on the at least one receiver device listed in said list of the at least one receiver device of said decentral network peer-to-peer.

5. The method as claimed in claim 1, adapted to identify at least one referent receiver device (7) relating to at least one piece of information of at least one message characterized in that said method identifies the at least one referent receiver device (7) from:

the at least one information contained in said at least one message of the at least one referent receiver device;

at least one message distribution algorithm; and and at least one list of at least one receiver device.

6. The method as claimed in claim 5, further adapted to validate and transmit at least one message to at least one referent receiver device (7), characterized in that said method comprises the following steps:

the at least one receiver device after receiving said at least one message:

verifies the validity of said at least one message and determines the referent receiver device (7) relating to the control key of said at least one message;

generates at least one validation message associated with the at least one message; and transmits said at least one message and said at least one validation message to said at least one referent receiver device (7) relating to the control key of said at least one message.

7. The method as claimed in claim 1, comprising at least one receiver device characterized in that it furthermore comprises at least one database.

8. The method as claimed in claim 1, stores and replicate at least one message in at least one database of at least one receiver device according to a data distribution algorithm, the method being characterized in that at least one receiver device identifies for at least one message at least one database and at least one receiver device as a function of:
   at least one information item relating to said at least one message;
   according to at least one data distribution algorithm; and
   according to at least one list of at least one receiver device.

9. The method as claimed in claim 1, adapted to connect at least one first message to at least one message chain via at least one validation message of at least one receiver device, characterized in that said method comprises the following steps:
   a first step where at least one receiver device:
      validates that-_at least a second message having control key (CC_IDA2) is connected to at least a first message having control key (CC_IDA1) by verifying the validity between the control key (CC_IDA1), the at least one public key (CPUB_IDA1) and the signature (SIG_IDA1) indicated in the at least one second message;
      calculates the public key (CTRL_PUBU) corresponding to the cryptographic private key of the transmitting device which generate the signature (SIG_DISPEM) of the at least one second message,
   a second step wherein said at least one receiver device adds at least one validation message to said at least one second message comprising the following information:
      the information relating to said message (PREMSG_VALID) comprising:
      the list (LIST_VALID) of at least one receiver device having previously validated said at least one first message;
      the control key (SIG_MSG) of the content of the second message and;
      a data area (DON);
      said public key (CTRL_PUBU) corresponding to the signature of the transmitting device (SIG_DISPEM) of the at least one second message,
      the information relating to the validation of said at least one receiver device (VALID_ROBOT) comprising:
      the status (STATUS) of the validation of said receiver device;
      the public key (PUB_ROBOT) associated with the at least one receiver device; and
      the cryptographic signature (SIG_ROBOT) generated by calculating and encrypting the control key of the content of at least one second message with the cryptographic private key associated with the at least one receiver device.

10. The method as claimed in claim 1, adapted to independently and asynchronously validate at least one message from at least one message chain, characterized in that, said method comprises the following steps:
   a first step where the at least one first receiver device validates and identifies the referent receiver device (7) relating to said at least one first message:
      generates a message (PREMSG_VALID);
      generates a message (VALID_ROBOT) attesting the validation of said at least one first message;
      transmits to at least one referent receiver device (7):
         said at least one first message;
         the message (PREMSG_VALID);
         and the message (VALID_ROBOT);
   a second step where at least one second receiver device, validates, identifies the referent receiver device (7) relating to said at least one first message:
      generates a message (PREMSG_VALID);
      generates a message (VALID_ROBOT) attesting to the validation of said at least one first message;
      transmits to at least one referent receiver device:
         said at least one first message;
         the message (PREMSG_VALID);
         the message (VALID_ROBOT),
   a third step where said at least one referent receiver device (7) relating to the at least one first receiver device receives the said at least one first transmitted message, the message (PREMSG_VALID) and the message (VALID_ROBOT) of at least one receiver device:
      stores said at least one first message transmitted only if it is not already stored and otherwise verifies that it is concordant with said at least one previously stored first message;
      stores said message (PREMSG_VALID) only if said message (PREMSG_VALID) is not already stored and otherwise verifies that it is concordant with said at least one message (PREMSG_VALID) previously stored;
      stores said message (VALID_ROBOT) only if said message (VALID_ROBOT) is not already stored,
   a fourth step where at least one receiver device receives at least one second message having the control key (CC_IDA2) and whose previous control key indicated (CC_IDA1) corresponds to the control key of said first message, and carries out the following operations:
      identifies the at least one referent receiver device (7) of the at least one first and the at least one second message;
      retrieves said at least one first message, the message (PREMSG_VALID) and the set of messages (VALID_ROBOT) from said at least one referent receiver device (7) of said at least one first message;
      checks the validity of each of the messages and a conformity criteria relating to the receiver devices that have generated a validation message (VALID_ROBOT);
      only if said conformity criteria are respected:
         generates a message (PREMSG_VALID) and a validation message (VALID_ROBOT) relating to the at least one second message; and
         transmits said at least one second message, the message (PREMSG_VALID) and the message (VALID_ROBOT) to said at least one referent receiver device (7) relating to the at least one second message.

11. The method as claimed in claim 1, adapted to validate at least one message from at least one message chain, taking into account the geographical position of at least one other receiver device having previously validated said message, characterized by the following steps:

at least one receiver device receives at least a second message having the control key (CC_IDA2) and whose previous control key indicated (CC_IDA1) corresponds to the control key of at least a first message, and performs the following operations:
   identifies the at least one first referent receiver device (7) relating to the at least one first message;
   identifies the at least one second referent receiver device (7) relating to said at least one second message;
   retrieves the message (PREMSG_VALID) and the set of messages (VALID_ROBOT) relative to said at least one first message from said at least one first referent receiver device (7) of said at least one first message;
   verifies the validity of each of the messages (PREMSG_VALID) and (VALID_ROBOT) and the geographical position of each of the at least one receiver device at the origin of at least one validation message (VALID_ROBOT) of the at least one first message;
   only if a compliance criteria relating to the geographical position of the at least one receiver device having generated a validation message (VALID_ROBOT) are complied does the followings:
      generates a message (PREMSG_VALID) containing the list (LIST_VALID) of the at least one device receiver causing a validation message relating to said first message and meeting said conformity criteria relating to the geographical position of the at least one receiver device causing a validation message relating to said first message;
      generates a validation message (VALID_ROBOT) relating to said at least one second message;
      transmits to the at least one second referent receiver device (7) relating to the second message: said at least one second message;
      the associated message (PREMSG_VALID); and
      the associated message (VALID_ROBOT).

12. The method as claimed in claim 1, adapted to validate a message in a message chain, taking into account the number of receiver devices having previously validated said message, the method being characterized in that it comprises the following steps:

at least one receiver device receives at least one second message having the control key (CC_IDA2) and whose previous control key indicated (CC_IDA1) corresponds to the control key of at least one first message, and carries out the following operations:
   identifies the at least one first referent receiver device (7) relating to said at least one first message;
   identifies the at least one second referent receiver device (7) relating to said at least one second message;
   retrieves the message (PREMSG_VALID) and the set of messages (VALID_ROBOT) relative to said at least one first message from said at least one first referent receiver device (7) of said at least one first message;
   verifies the validity of each of the messages (PREMSG_VALID) and (VALID_ROBOT) and the number of receiver devices originally of at least one validation message (VALID_ROBOT) of said first message;
   only if compliance criteria relating to the number of receiver devices that have generated a validation message (VALID_ROBOT) are complied:
      generates a message (PREMSG_VALID) containing the list (LIST_VALID) of the at least one receiver device at the origin of a validation message relating to said first message and meeting the conformance criteria relating to the number of receiver devices that generate a validation message relating to said first message;
      generates a validation message (VALID_ROBOT) relating to said at least one second message;
      transmits to the at least one second referent receiver device (7) relating to the second message:
      said at least one second message;
      the associated message (PREMSG_VALID); and
      the message (VALID_ROBOT) associated.

13. The method as claimed in claim 1, further configured to transparently process data hosted by external devices (5) on a decentralized network of trust-limited trusted third parties to validate the messages.

* * * * *